(12) United States Patent  
Mouri et al.

(10) Patent No.: US 8,016,349 B2
(45) Date of Patent: Sep. 13, 2011

(54) MOTORIZED BICYCLE SEATPOST ASSEMBLY

(75) Inventors: Seiji Mouri, Osaka (JP); Toshikuni Suzuki, Osaka (JP)

(73) Assignee: Shimano Inc., Osaka (JP)

( * ) Notice: Subject to any disclaimer, the term of this patent is extended or adjusted under 35 U.S.C. 154(b) by 71 days.

(21) Appl. No.: 12/549,436

(22) Filed: Aug. 28, 2009

(65) Prior Publication Data

US 2011/0049945 A1     Mar. 3, 2011

(51) Int. Cl.
   *B62J 1/00* (2006.01)
(52) U.S. Cl. .................................. 297/215.13
(58) Field of Classification Search .............. 297/215.13
   See application file for complete search history.

(56) References Cited

U.S. PATENT DOCUMENTS

| 5,324,058 A * | 6/1994 | Massaro ............... 297/215.13 X |
| 6,050,585 A * | 4/2000 | Rai ....................... 297/215.13 X |
| 7,909,348 B2 * | 3/2011 | Klieber ................ 297/215.13 X |

FOREIGN PATENT DOCUMENTS

| JP | 2005-231567 A | 9/2005 |
| JP | 2005-262900 A | 9/2005 |

* cited by examiner

*Primary Examiner* — Rodney B White
(74) *Attorney, Agent, or Firm* — Global IP Counselors, LLP (57) ABSTRACT

A motorized bicycle seatpost assembly is basically provided with a first tube, a second tube, a motor and a movement mechanism. The first tube has a first end and a second end. The second tube has a first end and a second end. The first end of the second tube is open such that the second end of the first tube is telescopically disposed in the first end of the second tube. The motor is arranged in at least one of the first tube and the second tube. The movement mechanism is connected to the motor to change a relative axial position between the first and second tubes.

12 Claims, 8 Drawing Sheets

MOTORIZED BICYCLE SEATPOST ASSEMBLY

BACKGROUND OF THE INVENTION

1. Field of the Invention

This invention generally relates to a seatpost that is adjustable to adjust the seat height of a bicycle seat. More specifically, the present invention relates to a motorized bicycle seatpost assembly to adjust the seat height of a bicycle seat.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing the insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame.

Recently, seatpost assemblies have been proposed that use motors in order to adjust the height of the seat. Examples of motorized seatpost assemblies are disclosed in Japanese Laid-Open Patent Application No. 2005-231567 and Japanese Laid-Open Patent Application No. 2005-262900. One drawback to these seatpost assemblies is that part of the seatpost assembly is fixed to the bicycle frame.

In view of the above, it will be apparent to those skilled in the art from this disclosure that there exists a need for an improved motorized bicycle seatpost assembly. This invention addresses this need in the art as well as other needs, which will become apparent to those skilled in the art from this disclosure.

SUMMARY OF THE INVENTION

One object of the present invention is to provide a motorized bicycle seatpost assembly that is simply to install in a seat tube of a bicycle frame and easy to operate.

The foregoing objects can basically be attained by providing a motorized bicycle seatpost assembly that mainly comprises a first tube, a second tube, a motor and a movement mechanism. The first tube has a first end and a second end. The second tube has a first end and a second end. The first end of the second tube is open such that the second end of the first tube is telescopically disposed in the first end of the second tube. The motor is arranged in at least one of the first tube and the second tube. The movement mechanism is connected to the motor to change a relative axial position between the first and second tubes.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
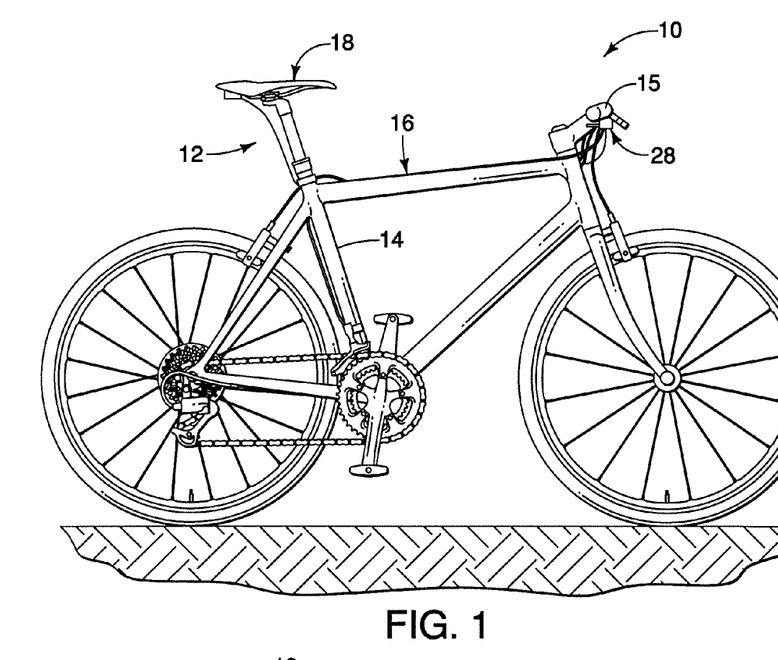
FIG. 1 is a side elevational view of a bicycle in which one embodiment of a motorized bicycle seatpost assembly is employed.
Figure 2:
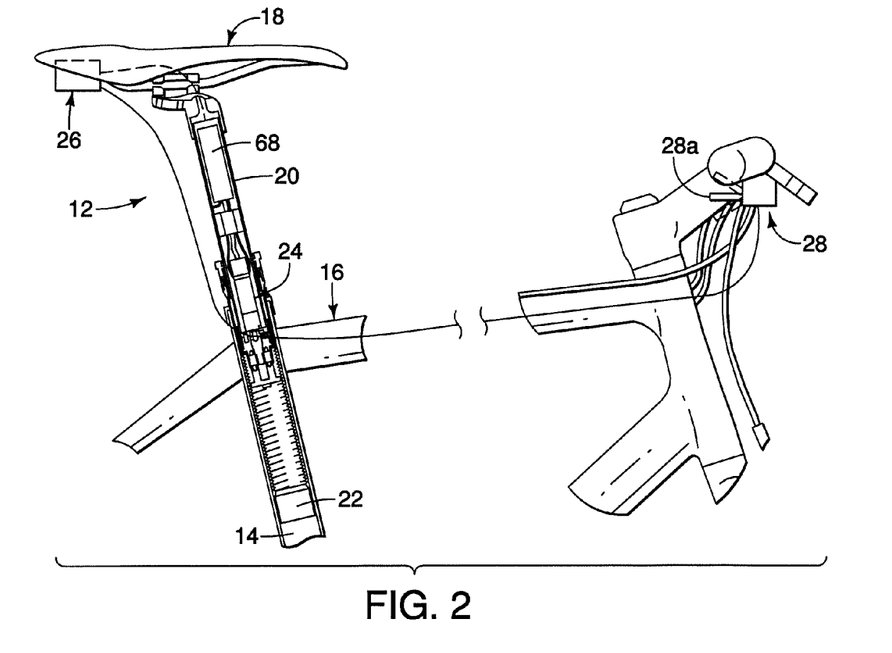
FIG. 2 is a partial side elevational view of the bicycle illustrated in FIG. 1 that is equipped with the motorized bicycle seatpost assembly in the upper or top seat position.

Referring initially to FIGS. 1 and 2, a bicycle 10 is illustrated that is equipped with a motorized bicycle seatpost assembly 12 in accordance with a first embodiment. The motorized bicycle seatpost assembly 12 is mounted to a seat tube 14 and a handlebar 15. The seat tube 14 is a conventional portion of a bicycle frame 16 that includes a clamping arrangement (not shown) for securing the motorized bicycle seatpost assembly 12 to the bicycle frame 16. The motorized bicycle seatpost assembly 12 adjusts a seat height of a bicycle seat 18 with respect to the bicycle frame 16. In this embodiment, the length of the telescoping seatpost 22 is adjustable to three preset seatpost positions, e.g., a high preset seatpost position, a middle preset seatpost position and a low preset seatpost position. The motorized bicycle seatpost assembly 12 basically includes an inner (first) tube 20, an outer (second) tube 22, a height adjustment device 24, a controller 26 and an operating switch 28. In this embodiment, the length of the inner and outer tubes 20 and 22 is adjustable to three preset seatpost positions, e.g., a high preset seatpost position, a middle preset seatpost position and a low preset seatpost position.

In general, the inner and outer tubes 20 and 22 are telescopically arranged, with the amount of insertion of the inner tube 20 into the outer tube 22 being adjustable. The inner and outer tubes 20 and 22 are a separate unit from the bicycle frame 16 such that the outer tube 22 is easily installed into the seat tube 14. The outer tube 22 is secured to the seat tube 14 by a conventional clamping arrangement (not shown) provided on the upper end of the seat tube 14. In particular, the upper end of the seat tube 14 is provided with a longitudinal slit such that the clamping arrangement adjusts the diameter of the upper end of the seat tube to squeeze the outer tube 22. The height adjustment device 24 is operatively connected to the inner and outer tubes 20 and 22 for selectively extending and retracting the inner tube 20 with respect to the outer tube 22 based on a motor control signal from the operating switch 28 via controller 26. More specifically, the controller 26 operates the height adjustment device 24 by selectively supplying electricity to the height adjustment device 24 based on the signal from the operating switch 28. When an operating lever 28a (FIG. 2) of the operating switch 28 is moved in an upward direction relative to the bicycle 10, the operating switch 28 outputs a first (up) motor control signal that extends the inner tube 20 with respect to the outer tube 22 for raising the seat 18 with respect to the bicycle frame 16. On the other hand, when the operating lever 28a of the operating switch 28 is moved in a downward direction relative to the bicycle 10, the operating switch 28 outputs a second (down) motor control signal that retracts the inner tube 20 with respect to the outer tube 22 for lowering the seat 18 with respect to the bicycle frame 16.

Figure 3:
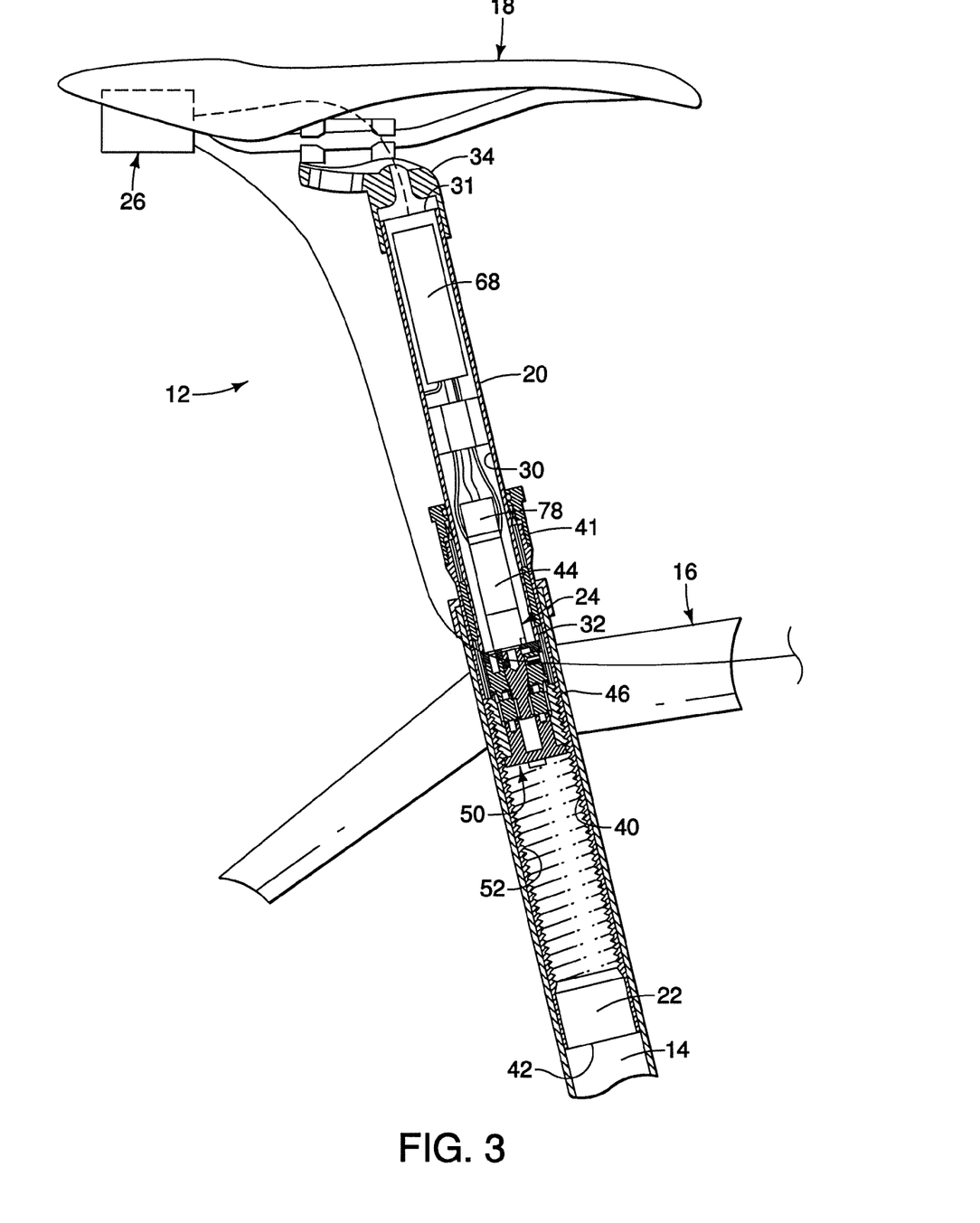
FIG. 3 is an enlarged longitudinal cross sectional view of the motorized bicycle seatpost assembly illustrated in FIGS. 1 and 2 in the upper or top seat position.
Figure 4:
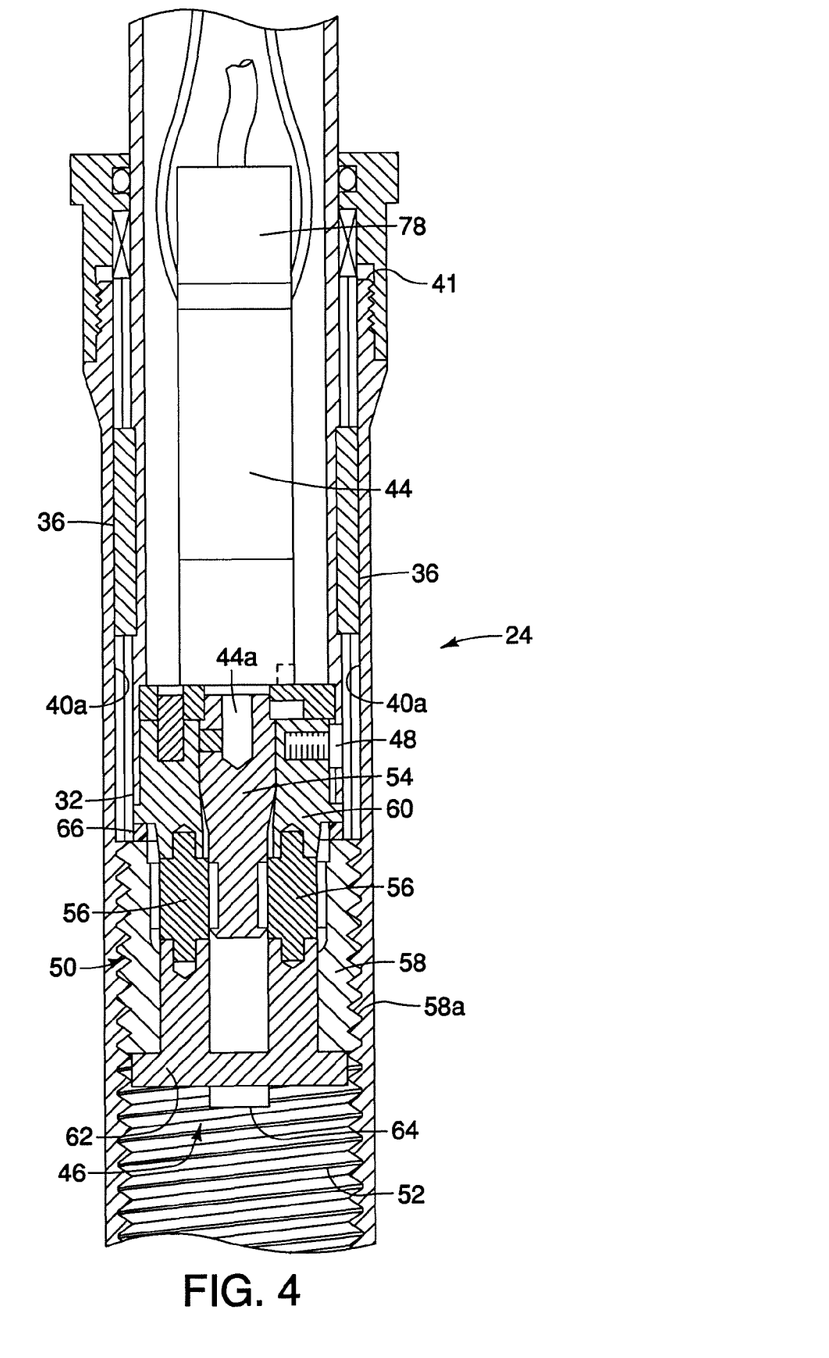
FIG. 4 is an enlarged longitudinal cross sectional view of a portion of the motorized bicycle seatpost assembly illustrated in FIGS. 1 to 3 in the upper or top seat position.
Figure 5:
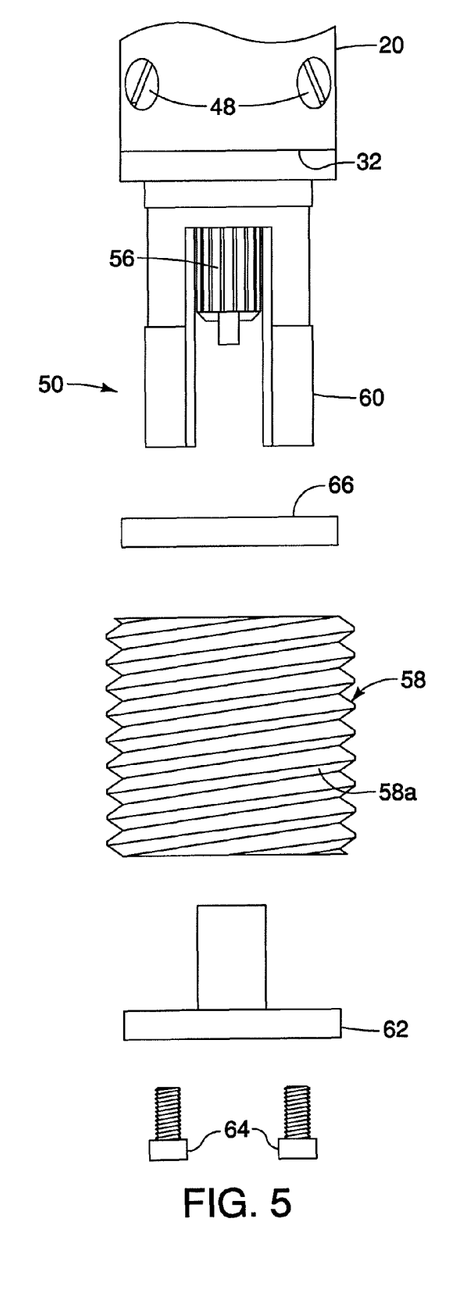
FIG. 5 is an exploded elevational view of selected parts of the portion of the motorized bicycle seatpost assembly illustrated in FIG. 4.
Figure 6:
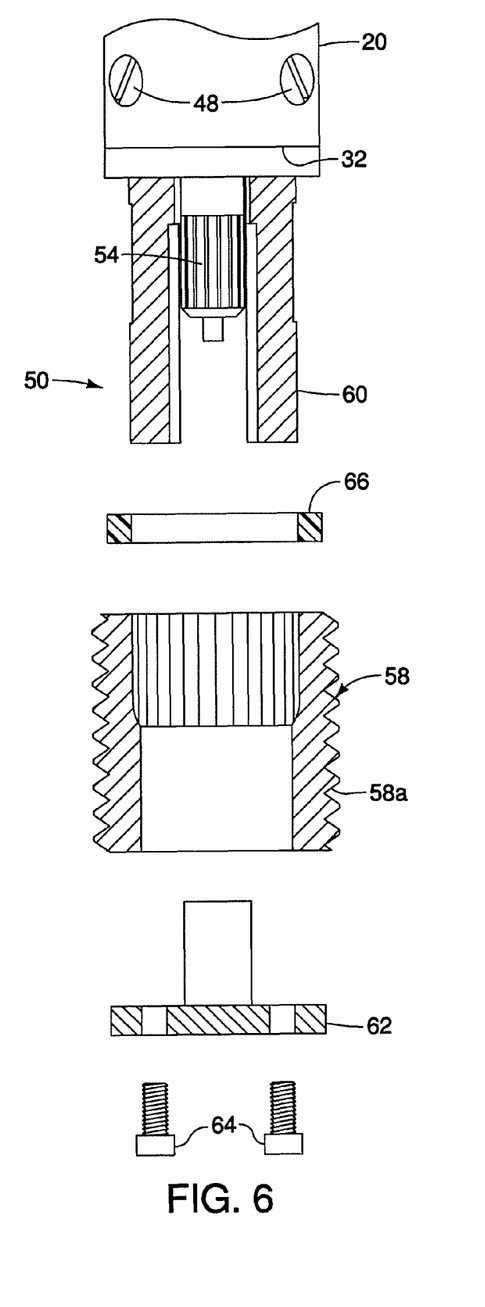
FIG. 6 is a longitudinal cross sectional view of the selected parts of the motorized bicycle seatpost assembly illustrated in FIG. 5.
Figure 7:
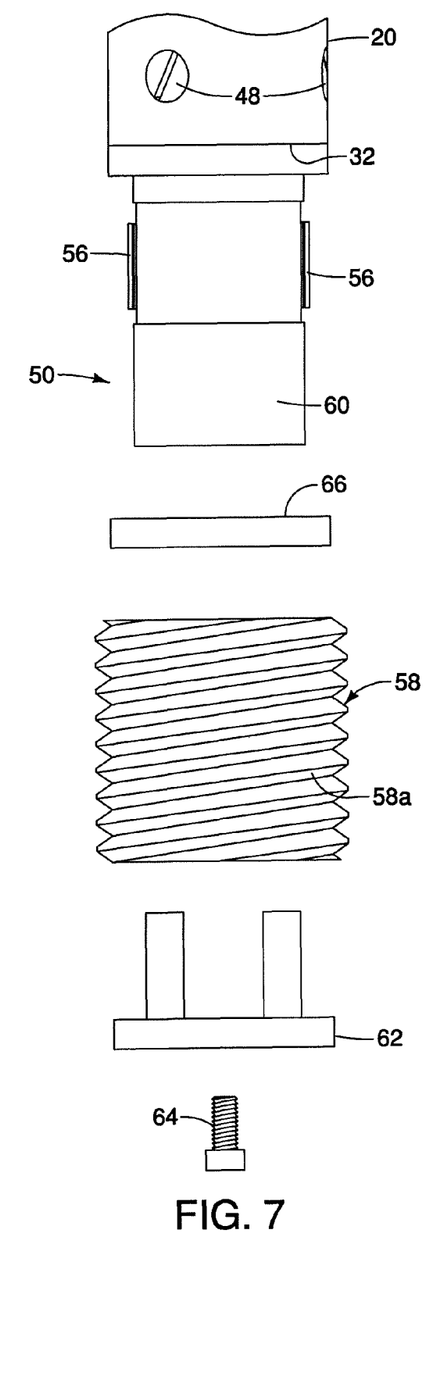
FIG. 7 is another exploded elevational view of selected parts of the portion of the motorized bicycle seatpost assembly illustrated in FIG. 5, but rotated ninety degrees with respect to FIG. 5.
Figure 8:
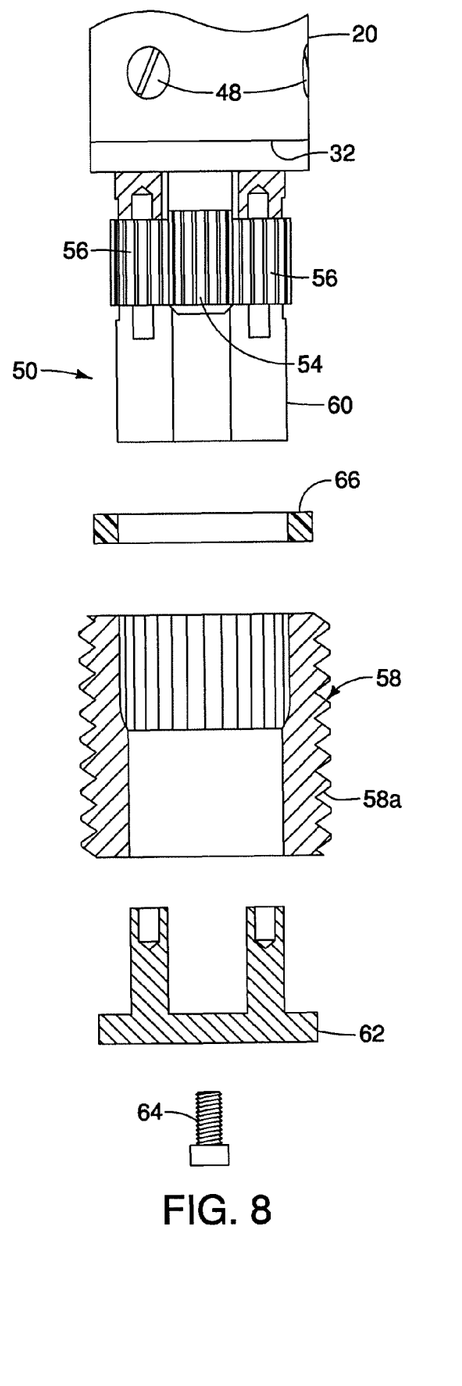
FIG. 8 is another longitudinal cross sectional view of the selected parts of the motorized bicycle seatpost assembly illustrated in FIG. 5, but rotated ninety degrees with respect to FIG. 5.
Figure 9:
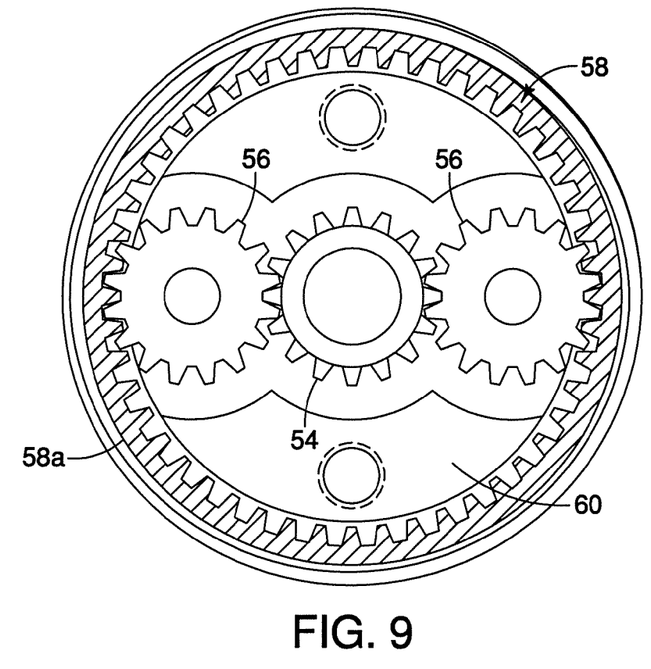
FIG. 9 is a transverse cross sectional view of the gear unit of the motorized bicycle seatpost assembly.
Figure 10:
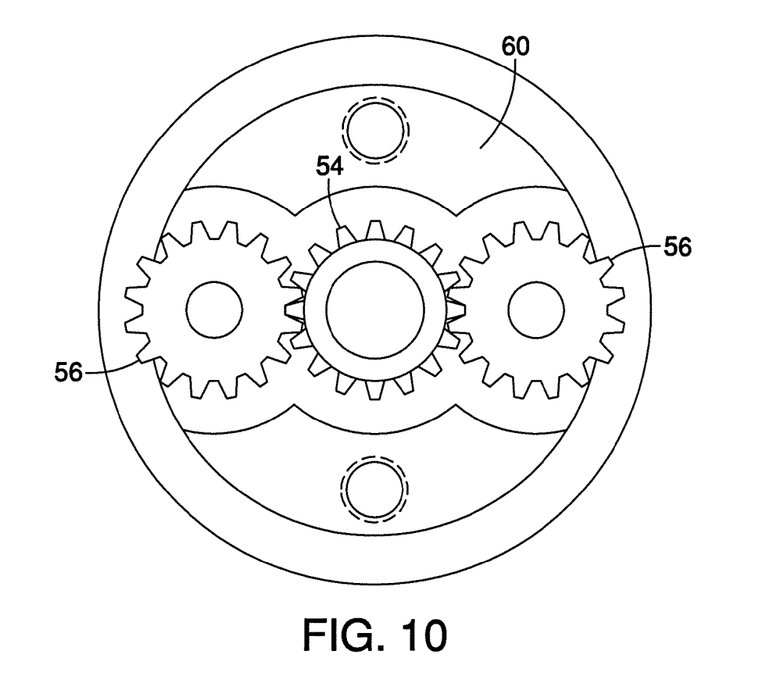
FIG. 10 is a bottom plan view of the gear unit of the motorized bicycle seatpost assembly with the ring gear removed.
Figure 11:
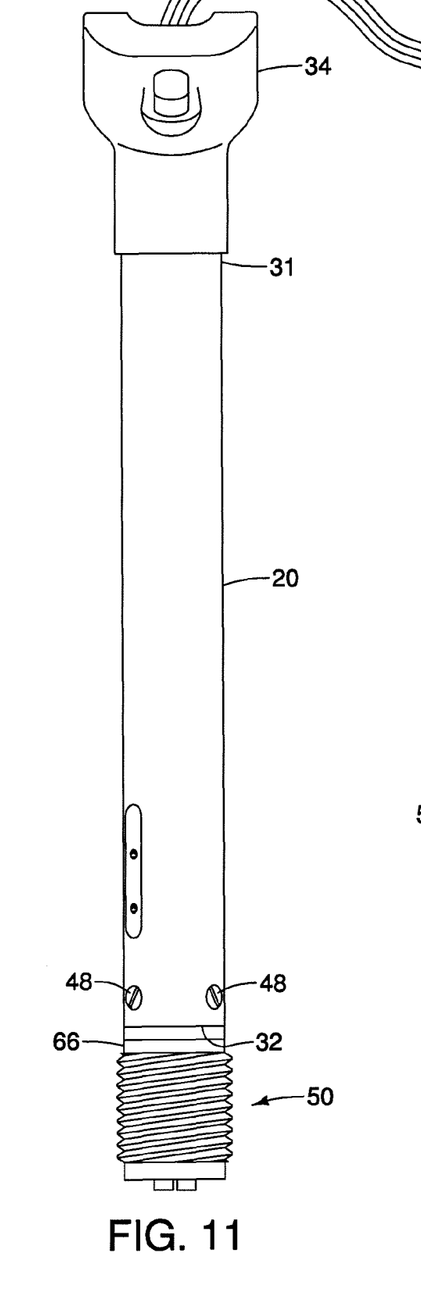
FIG. 11 is an elevational view of an upper part of the motorized bicycle seatpost assembly illustrated in FIGS. 1 to 10.
Figure 12:
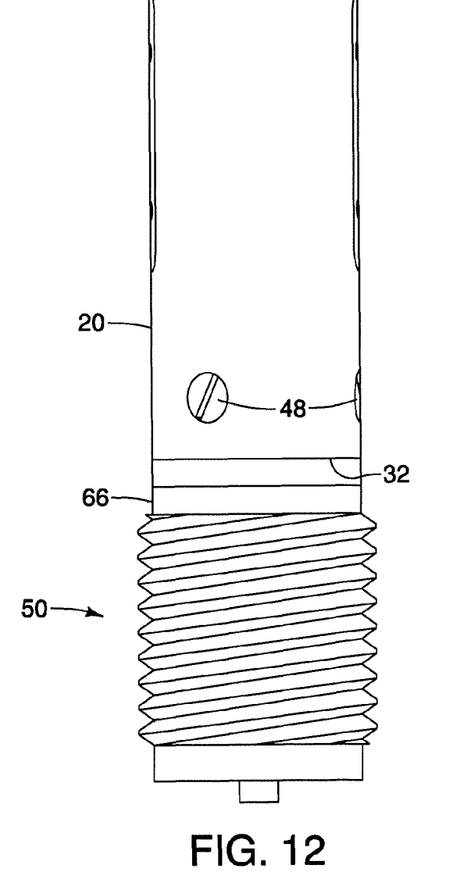
FIG. 12 is an enlarged elevational view of a bottom portion of the upper part of the motorized bicycle seatpost assembly illustrated in FIGS. 1 to 10.

As seen in FIG. 3, the inner tube 20 has an interior bore 30, a first end 31 and a second end 32. The second end 32 of the inner tube 20 is open such that the interior bore 30 of the inner tube 20 extends longitudinally from the second end 32 of the inner tube 20 towards the first end 31 of the inner tube 20. The first end 31 of the inner tube 20 includes a seat mounting member 34 that secures the bicycle seat 18 thereto. As seen in FIG. 4, the outer surface of the second end 32 of the inner tube 20 has a pair of anti-rotation keys 36 attached to the outer surface of the second end 32 of the inner tube 20. The inner and outer tubes 20 and 22 are non-rotatably connected together by the anti-rotation keys 36.

As seen in FIG. 3, the outer tube 22 has an interior bore 40, a first end 41 and a second end 42. The first end 41 of the outer tube 22 is open such that the interior bore 40 of the outer tube 22 extends longitudinally from the first end 41 of the outer tube 22 towards the second end 42 of the outer tube 22. In other words, the first end 41 of the outer tube 22 is open such that the second end 32 of the inner tube 20 is telescopically disposed in the first end 41 of the outer tube 22. As seen in FIG. 4, the interior bore 40 of the outer tube 22 has a pair of longitudinally extending slots 40a that slidably receives the anti-rotation keys 36 of the second end 32 of the inner tube 20 to prevent relative rotation between the inner and outer tubes 20 and 22.

The height adjustment device 24 basically includes a reversible electric motor 44 and a linear movement mechanism 46. The motor 44 is arranged in at least one of the inner and outer tubes 20 and 22. In this illustrated embodiment, the motor 44 is rigidly secured to the second end 32 of the inner tube 20 via the linear movement mechanism 46 by three screws 48. The linear movement mechanism 46 is operatively disposed between the inner and outer tubes 20 and 22. The linear movement mechanism 46 basically includes a gear unit 50 mounted to the inner tube 20 by the screws 48 and a female thread 52 formed on the interior bore 40 of the outer tube 22.

The gear unit 50 includes a pinion gear 54, a pair of idle gears 56, a ring gear 58, a first gear housing part 60 and a second gear housing part 62. The pinion gear 54 is rigidly mounted on an output shaft 44a of the motor 44. The teeth of the idle gears 56 are rotatably engaged with the teeth of the pinion gear 54. The internal teeth of the ring gear 58 are rotatably engaged with teeth of the idle gears 56. The ring gear 58 also has a male thread 58a on its outer surface that is threadedly engaged with the female thread 52 that is disposed on the interior bore 40 of the outer tube 22. As seen in FIGS. 4 to 12, the first gear housing part 60 is secured to the inner tube 20 by the screws 48, while the second gear housing part 62 is attached to the first gear housing part 60 by two screws 64. The ring gear 58 is rotatably disposed between the first and second gear housing parts 60 and 62. Preferably a plastic ring 66 is disposed between the ring gear 58 and the first gear housing part 60 so that the ring gear 58 smoothly can rotate relative to the first gear housing part 60.

As seen in FIG. 4, the gear unit 50 of the linear movement mechanism 46 is operatively connected to the output shaft 44a of the motor 44 to change a relative axial position between the inner and outer tubes 20 and 22. In this illustrated embodiment, the linear movement mechanism 46 is partially attached to the second end 32 of the inner tube 20 and partially formed in the first end 41 of the outer tube 22. In other words, the linear movement mechanism 46 is operatively connected to the output shaft 44a of the motor 44 within the second end 32 of the inner tube 20, and is partially disposed between the inner and outer tubes 20 and 22 to change insertion quantity of the inner tube 20 in the outer tube 22.

Basically, the motor 44 receives electrical power (electricity) from a battery 68 via the controller 26. In particular, the battery 68 is disposed completely inside the inner tube 20 and electrically connected to the motor 44 via the controller 26. The motor 44 is also disposed completely inside the inner tube 20. The motor 44 is operatively connected to the linear movement mechanism 46 to selectively extend or retract the inner tube 20 relative to the outer tube 22.

Figure 13:
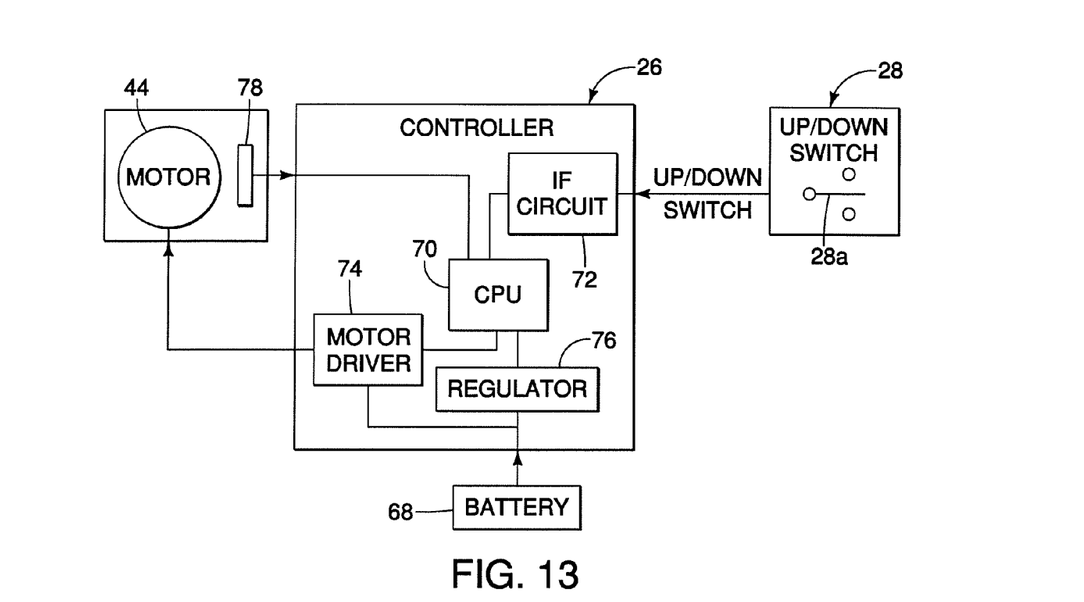
FIG. 13 is a schematic electrical diagram for the motorized bicycle seatpost assembly illustrated in FIGS. 1 to 12.

As seen in FIG. 13, the controller 26 is operatively connected to the motor 44 with the controller 26 having three different preset seat position settings that selectively operate the motor 44 to move the inner tube 20 relative to the outer tube 22. In this illustrated embodiment, the controller 26 includes among other things, a central processing unit or CPU 70, an intermediate frequency (IF) circuit 72, a motor driver 74 and a regulator 76. The controller 26 is powered by the battery 68 that is mounted completely within the inner tube 20.

The central processing unit 70 preferably includes a microcomputer. The central processing unit 70 can also include other conventional components such as an input interface circuit, an output interface circuit, and storage devices such as a ROM (Read Only Memory) device and a RAM (Random Access Memory) device. The intermediate frequency (IF) circuit 72, the motor driver 74 and the regulator 76 are conventional components that are well known in the field. Thus, the components 72, 74 and 76 will not be discussed in detail herein.

Figure 14:
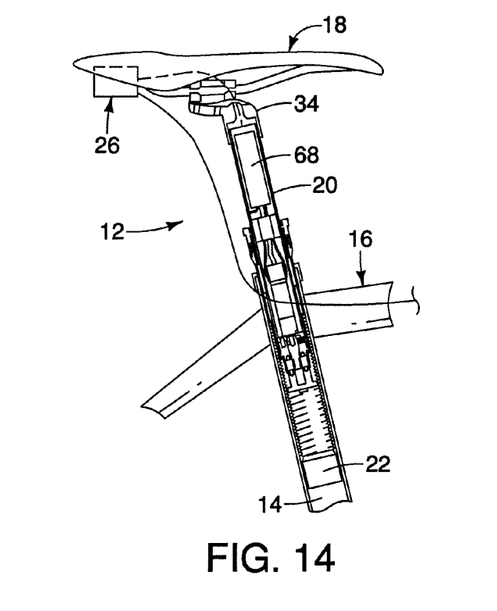
FIG. 14 is a longitudinal cross sectional view of the motorized bicycle seatpost assembly illustrated in FIGS. 1 to 3 in the middle seat position.
Figure 15:
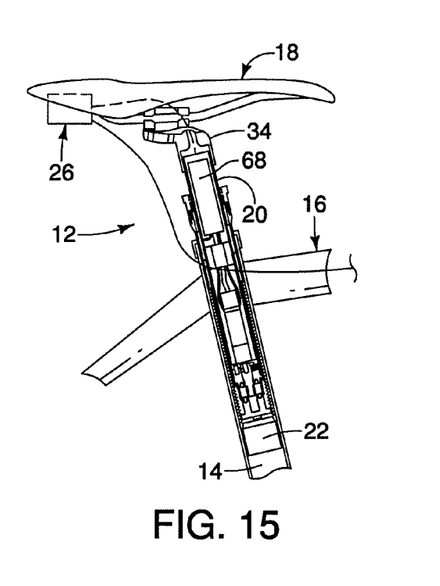
FIG. 15 is a longitudinal cross sectional view of the motorized bicycle seatpost assembly illustrated in FIGS. 1 to 4 in the lower or bottom seat position.

A position detecting device 78 is operatively connected to the controller 26. The position detecting device 78 detects a relative position between the inner and outer tubes 20 and 22. Preferably, the position detecting device 78 detects the relative position between the first inner and outer tubes 20 and 22 by detecting a rotation amount of the motor 44 when the controller 26 operates the motor 44. In particular, in the illustrated embodiment, the position detecting device 78 includes an encoder that is mounted on the motor 44 completely within the inner tube 20. The encoder of the position detecting device 78 determine the rotational amount of the motor 44 for determining the high, middle and low preset seat positions. The high seat position (shown in FIG. 2) is a riding position for when the bicycle 10 runs in the flat road or uphill. The middle position (shown in FIG. 14) is a riding position for when the bicycle 10 runs in the slightly rapid downhill. The low position (shown in FIG. 15) is a riding position for when the bicycle 10 runs in the considerably rapid downhill.

The operating switch 28 is operatively connected to the controller 26, and thus operatively connected to the motor 44. The operating switch 28 generates a motor control signal to operate the motor 44 in response to operation of the operating switch 28. The electrical power from the battery 68 is supplied to the operating switch 28 via the controller 26 for generating the motor control signals.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the motorized bicycle seatpost assembly. Accordingly, these terms, as utilized to describe the present invention should be interpreted relative to a bicycle equipped with the motorized bicycle seatpost assembly as used in the normal riding position.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motorized bicycle seatpost assembly comprising:
   a seat tube;
   a first tube having a first end and a second end;
   a second tube having a first end and a second end, with the first end of the second tube being open such that the second end of the first tube is telescopically disposed in the first end of the second tube, the second end of the second tube being removably secured in the seat tube;
   a motor arranged in at least one of the first tube and the second tube; and
   a movement mechanism connected to the motor to change a relative axial position between the first and second tubes, the movement mechanism including a gear unit mounted to the first tube.

2. A motorized bicycle seatpost assembly comprising:
   a first tube having a first end and a second end;
   a second tube having a first end and a second end, with the first end of the second tube being open such that the second end of the first tube is telescopically disposed in the first end of the second tube;
   a motor arranged in at least one of the first tube and the second tube; and
   a movement mechanism connected to the motor to change a relative axial position between the first and second tubes,
   the movement mechanism including a gear unit mounted to the first tube and a female thread disposed on an interior bore of the second tube,
   the gear unit including a pinion gear mounted on an output shaft of the motor, at least one idle gear engaged with the pinion gear, and a ring gear engaged with the idle gear, the ring gear having a male thread engaged with the female thread of the second tube.

3. The motorized bicycle seatpost assembly according to claim 1, further comprising
   a switch that generates a motor control signal to operate the motor.

4. The motorized bicycle seatpost assembly according to claim 3, further comprising
   a controller operatively connected to the switch and operatively connected to the motor.

5. A motorized bicycle seatpost assembly comprising:
   a first tube having a first end and a second end;
   a second tube having a first end and a second end, with the first end of the second tube being open such that the second end of the first tube is telescopically disposed in the first end of the second tube;
   a motor arranged in at least one of the first tube and the second tube;
   a movement mechanism connected to the motor to change a relative axial position between the first and second tubes;
   a switch that generates a motor control signal to operate the motor; and
   a controller operatively connected to the switch and operatively connected to the motor, the controller having three different preset seat position settings that selectively operate the motor to move the first tube relative to the second tube.

6. A motorized bicycle seatpost assembly comprising:
a first tube having a first end and a second end;
a second tube having a first end and a second end, with the first end of the second tube being open such that the second end of the first tube is telescopically disposed in the first end of the second tube;
a motor arranged in at least one of the first tube and the second tube;
a movement mechanism connected to the motor to change a relative axial position between the first and second tubes;
a switch that generates a motor control signal to operate the motor;
a controller operatively connected to the switch and operatively connected to the motor; and
a position detecting device operatively connected to the controller, the position detecting device detecting the relative axial position between the first and second tubes.

7. The motorized bicycle seatpost assembly according to claim 6, wherein
the position detecting device detects the relative position between the first and second tubes by detecting a rotation amount of the motor when the controller operates the motor.

8. The motorized bicycle assembly according to claim 1, wherein
the first and second tubes are non-rotatably connected together.

9. The motorized bicycle seatpost assembly according to claim 1, wherein
the first end of the first tube includes a seat mounting member.

10. The motorized bicycle seatpost assembly according to claim 1, wherein
the motor is a reversible electric motor.

11. A motorized bicycle seatpost assembly comprising:
a seat tube;
a first tube having a first end and a second end;
a second tube having a first end and a second end, with the first end of the second tube being open such that the second end of the first tube is telescopically disposed in the first end of the second tube, the second end of the second tube being removably secured in the seat tube;
a motor arranged in at least one of the first tube and the second tube; and
a movement mechanism connected to the motor to change a relative axial position between the first and second tubes,
the first tube having an external surface with a male thread,
the second tube having an interior bore with a female thread, and
the male thread of the first tube mating with the female thread of the second tube, with the female thread of the second tube extending along the inner bore of the second tube for a length that is greater than a length for which the male thread extends along the external surface of the first tube.

12. The motorized bicycle seatpost assembly according to claim 1, wherein
the motor moves, when the relative axial position is changed, together with the at least one of the first tube and the second tube in which the motor is arranged.

* * * * *